United States Patent
Iwasaki et al.

(10) Patent No.: US 9,413,008 B2
(45) Date of Patent: Aug. 9, 2016

(54) ELECTRODE, NONAQUEOUS ELECTROLYTE BATTERY, AND BATTERY PACK

(71) Applicants: Takuya Iwasaki, Uenohara (JP); Hiroki Inagaki, Yokohama (JP); Norio Takami, Yokohama (JP)

(72) Inventors: Takuya Iwasaki, Uenohara (JP); Hiroki Inagaki, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/727,946

(22) Filed: Dec. 27, 2012

(65) Prior Publication Data
US 2013/0252077 A1    Sep. 26, 2013

(30) Foreign Application Priority Data

Mar. 26, 2012 (JP) ................................. 2012-070306

(51) Int. Cl.
| | |
|---|---|
| *H01M 4/131* | (2010.01) |
| *H01M 4/60* | (2006.01) |
| *H01M 4/13* | (2010.01) |
| *H01M 4/62* | (2006.01) |
| H01M 4/48 | (2010.01) |

(52) U.S. Cl.
CPC ................ *H01M 4/602* (2013.01); *H01M 4/13* (2013.01); *H01M 4/622* (2013.01); *H01M 4/131* (2013.01); *H01M 4/483* (2013.01); *Y02E 60/122* (2013.01)

(58) Field of Classification Search
CPC ...... H01M 4/525; H01M 4/131; H01M 4/485
USPC .............................................. 429/163
See application file for complete search history.

(56) References Cited

U.S. PATENT DOCUMENTS

| | | | | |
|---|---|---|---|---|
| 2004/0048152 | A1* | 3/2004 | Yata ..................... | H01M 2/0207 429/162 |
| 2004/0072072 | A1* | 4/2004 | Suzuki ............... | C01G 45/1221 429/231.1 |
| 2008/0261113 | A1* | 10/2008 | Huang et al. ................... | 429/221 |
| 2009/0136845 | A1* | 5/2009 | Choi et al. .................... | 429/212 |
| 2012/0009475 | A1* | 1/2012 | Nakura ........................ | 429/220 |

FOREIGN PATENT DOCUMENTS

| | | | | |
|---|---|---|---|---|
| CH | EP 1207572 A1 * | 5/2002 | ............ | B82Y 20/00 |
| JP | 2003-317722 | 11/2003 | | |
| JP | 2004-79370 | 3/2004 | | |
| JP | 2013-182673 | 9/2013 | | |
| WO | WO 2011/114641 | * 9/2011 | | |

OTHER PUBLICATIONS

Office Action issued Jul. 15, 2014, in corresponding Japanese Patent Application No. 2012-070306, (with English-language Translation).
Office Action issued Nov. 11, 2014, in corresponding Japanese Patent Application No. 2012-070306 (with English-language Translation).

* cited by examiner

*Primary Examiner* — Stewart Fraser
*Assistant Examiner* — Olatunji Godo
(74) *Attorney, Agent, or Firm* — Oblon, McClelland, Maier & Neustadt, L.L.P.

(57) ABSTRACT

According to one embodiment, there is provided an electrode. The electrode includes a current collector and an active material layer provided on the current collector. The active material layer contains an active material and an acrylic based polymer.

12 Claims, 6 Drawing Sheets

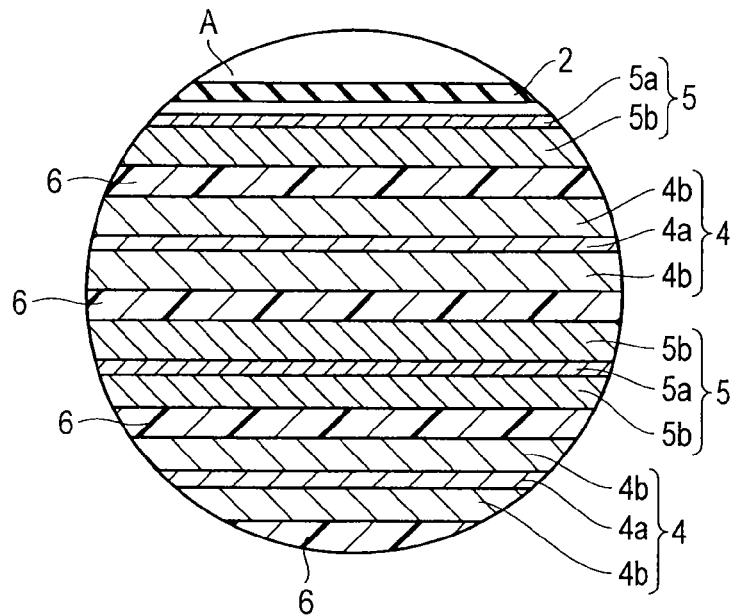
F I G. 3
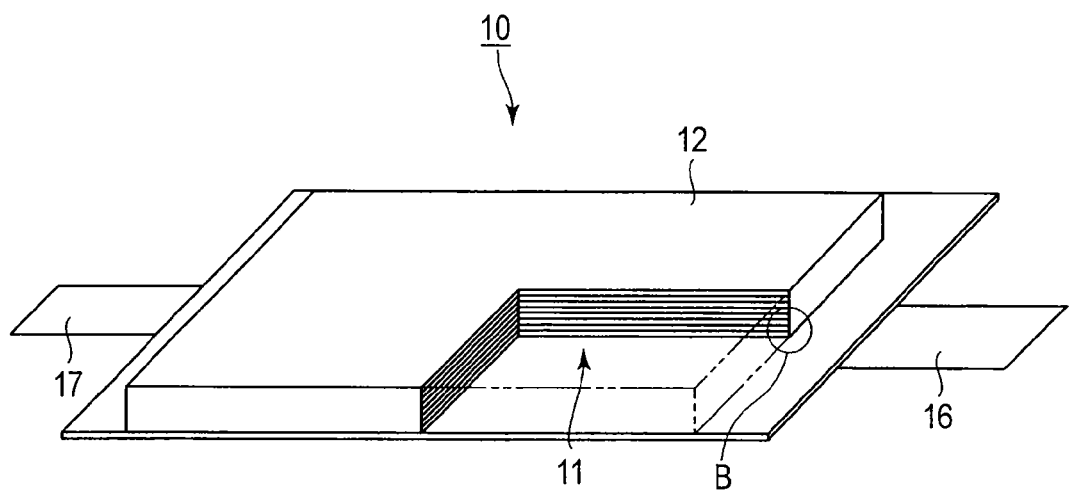
F I G. 4

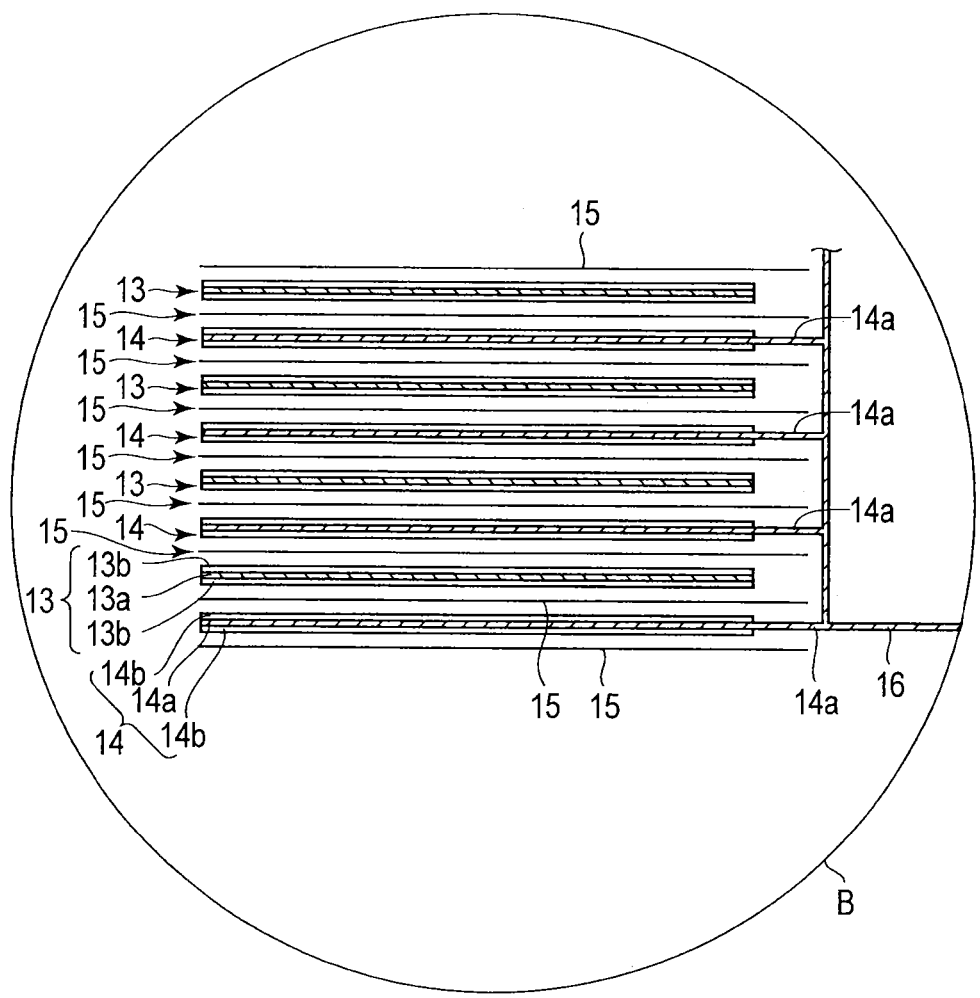
F I G. 5

ELECTRODE, NONAQUEOUS ELECTROLYTE BATTERY, AND BATTERY PACK

CROSS-REFERENCE TO RELATED APPLICATIONS

This application is based upon and claims the benefit of priority from Japanese Patent Application No. 2012-070306, filed Mar. 26, 2012, the entire contents of which are incorporated herein by reference.

FIELD

Embodiments described herein relate to an electrode, a nonaqueous electrolyte battery, and a battery pack.

BACKGROUND

Nonaqueous electrolyte battery attracts attentions as power sources used for hybrid vehicles, electric vehicles, and a like. Such a use requires that the nonaqueous electrolyte battery have such performances as a large capacity, long life, and good input/output performances.

Generally, a carbon based material has been used as a negative electrode active material for a nonaqueous electrolyte battery. Recently, lithium titanate having a spinel structure has also been used. The volume of Lithium titanate having a spinel structure is not changed with a charge/discharge reaction. Therefore, it has an excellent cycle performance. Further, it has high safety because Lithium titanate having a spinel structure has a low possibility of occurrence of lithium dendrite compared with the case of using a carbon based material. Further, because the lithium titanate is ceramics, thermo runaway of the battery is hard to occur.

On the other hand, a monoclinic β-type titanium complex oxide has attracted remarkable attention as a negative electrode active material in recent years. The monoclinic β-type titanium complex oxide has the advantage that it has a high capacity.

In nonaqueous electrolyte battery using a material like that mentioned above, it is desired to more improve performances such as a large capacity and long life.

BRIEF DESCRIPTION OF THE DRAWINGS

FIG. 3 is an enlarge sectional view of the part A in FIG. 2;

FIG. 4 is a partially broken perspective view of another nonaqueous electrolyte battery;

FIG. 5 is an enlarge sectional view of the part B in FIG. 4;

DETAILED DESCRIPTION

In general, according to one embodiment, there is provided an electrode. The electrode includes a current collector and an active material layer provided on the current collector. The active material layer contains an active material and an acrylic based polymer.

Each embodiment will be explained with reference to the drawings. Structures common to these embodiments are designated by the same signs and duplicate explanations of these structures are omitted here. Each drawing is a typical view for explaining the embodiment and for promoting the understanding of the embodiment. Though there are parts different from an actual battery in shape, dimension and ratio, these structural designs may be properly changed taking the following explanations and known technologies into consideration.

First Embodiment

Figure 1:
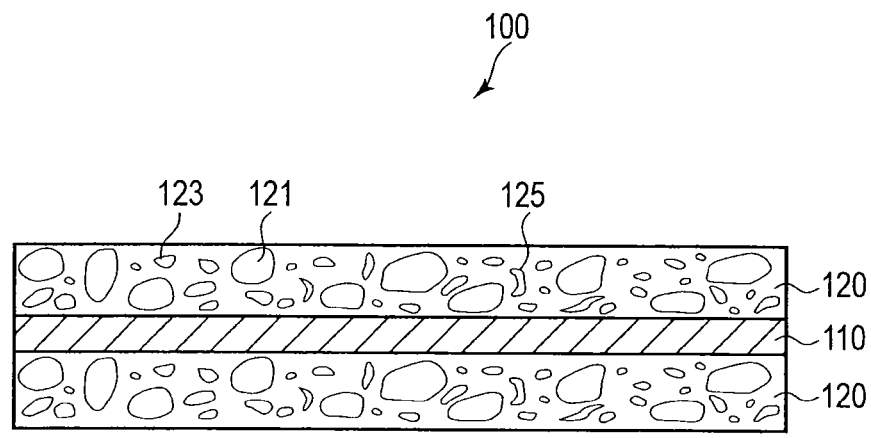
FIG. 1 is a typical sectional view of an electrode according to a first embodiment.

An electrode according to a first embodiment will be explained. FIG. 1 is a typical sectional view of the electrode.

An electrode 100 contains a current collector 110 and an active material layer 120. The active material layer 120 is provided on each surface of the current collector 110. The active material layer 120 contains an active material 121, a conductive agent 123 and a binder 125. The active material layer 120 may be provided on only one surface of the current collector 110.

The electrode 100 according to the embodiment is preferably used as an electrode in a nonaqueous electrolyte secondary battery and more preferably used as a negative electrode.

As the active material 121, a compound in which insertion of lithium ion occurs at a potential of 0.4 V or more relative to metallic lithium is used. The use of such a compound can limit the precipitation of metallic lithium on the surface of the electrode. For this, internal short circuits developed when a battery charge/discharge at a large current can be prevented. Example of such a compound includes metal oxide, metal sulfide, metal nitride, and alloy. Hereinafter, the potential relative to metallic lithium is referred "V (vs. Li/Li$^+$)". Active materials in which insertion of lithium ion occurs at a potential of 3 V (vs. Li/Li$^+$) or less and preferably 2 V (vs. Li/Li$^+$) or less are preferably used.

Example of the metal oxide includes titanium-containing metal complex oxide, tin oxide such as $SnB_{0.4}P_{0.6}O_{3.1}$ or $SnSiO_3$, silicon oxide such as SiO, and tungsten oxide such as $WO_3$. Among these compounds, titanium-containing metal complex oxide is preferable.

Example of the titanium-containing metal complex oxide includes lithium-titanium oxide, titanium based oxide, and lithium-titanium oxide in which part of the structural elements thereof are substituted with heteroatoms. The titanium oxide permits the intercalation of lithium ions when a battery incorporated with the electrode charge/discharge.

Example of the lithium-titanium oxide includes lithium titanate having a spinel structure (for example, $Li_{4+x}Ti_5O_{12}$) and lithium titanate having a rhamsdelite structure (for example, $Li_{2+y}Ti_3O_7$). In the above formula, x and y vary when a battery charge/discharge and satisfy the relationship represented by the inequality of 0≤x≤3 and 0≤y≤3, respectively.

Example of the titanium oxide includes $TiO_2$, monoclinic β-type titanium complex oxide, and metal complex oxide containing Ti and at least one element selected from the group consisting of V, Sn, Cu, Ni, Co, and Fe. Among these compounds, monoclinic β-type titanium complex oxide is preferably used.

The monoclinic β-type titanium complex oxide means titanium complex oxide having the crystal structure of monoclinic titanium dioxide. The crystal structure of monoclinic titanium dioxide belongs primarily to the space group C2/m. Hereinafter, the monoclinic β-type titanium complex oxide is called "TiO$_2$(B)". TiO$_2$(B) includes those in which a part of their structural elements is substituted with a heteroatom such as Li.

Example of the metal complex oxide containing Ti and at least one element selected from the group consisting of V, Sn, Cu, Ni, Co, and Fe includes TiO$_2$—V$_2$O$_5$, TiO$_2$—P$_2$O$_5$—SnO$_2$, and TiO$_2$—P$_2$O$_5$—MeO (here, Me is at least one element selected from Cu, Ni, Co, and Fe). This metal complex oxide preferably has a structure in which a crystal phase and an amorphous phase coexist or a structure in which an amorphous phase singly exists. When the metal complex oxide has such a microstructure, the cycle performance can be remarkably improved.

Example of the metal sulfide includes titanium based sulfide such as TiS$_2$, molybdenum based sulfide such as MoS$_2$, and iron based sulfide such as FeS, FeS$_2$, Li$_x$FeS$_2$ (0≤x≤4).

Example of the metal nitride includes lithium based nitride such as (Li,Me)$_3$N (here, Me is a transition metal element).

The active material 121 may contain either any one of the above compounds singly or two or more of the above compounds. Further, the active material 121 may contain other compounds.

The active material 121 is preferably selected from the group consisting of lithium titanate having a spinel structure, TiO$_2$(B), silicon, silicon-containing complex oxide, and graphite.

TiO$_2$(B) may have a form of primary particle. Alternatively, TiO$_2$(B) may have a form of secondary particle that is constructed by aggregated primary particles. TiO$_2$(B) is preferably in the form of secondary particles from the viewpoint of the stability of a slurry used to produce an electrode. Because secondary particle has a relatively smaller specific surface area, a side reaction with an electrolytic solution can be restricted when the electrode is used.

The conductive agent 123 is formulated to improve current collecting performance and to restrain the contact resistance with the current collector 110. Example of the conductive agent 123 includes carbon based materials such as cokes, carbon black, and graphite. The average particle diameter of the carbon based materials is preferably 0.1 μm to 10 μm. When the average particle diameter is 0.1 μm or more, the generation of gas can be efficiently restricted. When the average particle diameter is 10 μm or less, a good conductive network is obtained. The specific surface area of the carbon based materials is preferably 10 m$^2$/g to 100 m$^2$/g. When the specific surface area is 10 m$^2$/g or more, a good conductive network is obtained. When the specific surface area is 100 m$^2$/g or less, the generation of gas can be efficiently limited.

The binder 125 contains an acrylic based polymer. The acrylic based polymer may be a polymer or a copolymer. Alternatively, the acrylic based polymer may contain both of the polymer and copolymer.

Example of monomer constituting the acrylic based polymer includes monomers having an acryl group and monomers having a methacryl group. The monomer having an acryl group is typically an acrylic acid or acrylate. The monomer having a methacryl group is typically a methacrylic acid or methacrylate.

Example of the monomer constituting acrylic based polymer includes ethylacrylate, methylacrylate, butylacrylate, 2-ethylhexylacrylate, isononylacrylate, hydroxyethylacrylate, methylmethacrylate, glycidyl methacrylate, acrylonitrile, acrylamide, styrene, and acrylamide.

The use of the binder 125 improves the adhesive property between the current collector 110 and the active material layer 120. The strength of the electrode can be thereby improved.

The total mass of the acrylic based polymer contained in the electrode is preferably in a range from 0.01% by mass to 10% by mass based on the total mass of the active material. When the content of the acrylic based polymer is 0.01% by mass or more, the adhesive property can be improved. When the content of the acrylic based polymer is 10% by mass or less, the conductivity of the electrode is not damaged.

The binder 125 preferably contains a polyvinylidene fluoride (PVdF). When the binder further contains PVdF, the adhesive property between the current collector 110 and the active material layer 120 is more improved. The strength of the electrode can be thereby improved.

The mass of PVdF contained in the electrode is preferably in a range from 0.01% by mass to 10% by mass based on the total mass of the active material. When the content of the PVdF is 0.01% by mass or more, the adhesive property can be improved. When the content of PVdF is 10% by mass or less, the conductivity of the electrode is not damaged.

The acrylic based polymer and PVdF can be blended in an optional ratio. The ratio of the total mass of the acrylic based polymer to the sum of the total mass of the acrylic based polymer and the mass of the PVdF is, for example, preferably in a range from 10% by mass to 90% by mass, more preferably in a range from 40% by mass to 80% by mass, and even more preferably in a range from 50% by mass to 70% by mass.

In the active material layer 120, the content of the active material 121 is preferably 70% by mass to 97% by mass. The content of the conductive agent 123 is preferably 1% by mass to 10% by mass. The content of the binder 125 is preferably 2% by mass to 20% by mass. When the amount of the conductive agent 123 is 1% by mass or more, the current collecting performance of the active material layer 120 can be improved. The content of the conductive agent 123 is preferably 10% by mass or less in order to improve capacity. When the amount of the binder 125 is 2% by mass or more, the binding ability between the active material layer 120 and the current collector 110 is sufficient and therefore, excellent cycle performance can be expected. On the other hand, the binder is preferably 20% by mass or less in order to improve capacity.

As the current collector 110, a metal foil such as an aluminum foil or aluminum alloy foil may be used. The thickness of the aluminum foil or aluminum alloy foil is preferably 20 μm or less and more preferably 15 μm or less. The weight of the electrode can be thereby reduced while maintaining the strength of the electrode. The purity of the aluminum foil is preferably 99% by mass or more. The aluminum alloy preferably contains at least one element selected from Mg, Zn, and Si. When the aluminum alloy contains transition metals such as Fe, Cu, Ni, or Cr, the content of these transition metals is preferably 1% by mass or less.

The electrode according to the embodiment can be manufactured by the following method. First, the active material, conductive agent, and binder are suspended in a proper solvent to prepare slurry. This slurry is applied to one or both surfaces of the current collector and dried to form the active material layer. Then, the active material layer is subjected to pressing. Alternatively, the active material, conductive agent, and binder are made into a pellet, which may be used as the active material layer. The active material layer thus obtained is disposed on the current collector to construct the electrode.

The adhesive property between the current collector 110 and the active material layer 120 can be improved by using the acrylic based polymer as the binder according to the embodiment. In an electrode having poor adhesive property, the active material layer is possibly peeled from the current collector when charging/discharging of the battery is performed. As a result, the resistance is increased, thereby deteriorating the cycle performance. However, according to the embodiment, the increase of resistance is limited because peeling of the active material layer is limited. This leads to improvement in cycle performance. Also, the adhesive property between particles such as the active material 121 and the conductive agent 123 can be improved by using the acrylic based polymer as the binder. This limits the occurrence of such a phenomenon that an electron conductive path is cut in the active material layer during charge/discharge of a battery. Thus, the battery can be improved in cycle performance.

Further, the electrode according to the embodiment can retain a large quantity of a nonaqueous electrolyte. Accordingly, the entire surface of the active material can be made into contact with the nonaqueous electrolyte. Thus, the concentration of lithium ions in the active material is easily uniformed. As a result, local overcharge/overdischarge is scarcely caused. Therefore, the utilization factor of the active material can be uniformed.

$TiO_2(B)$, silicon, a silicon-containing complex oxide, graphite, and the like are largely changed in crystal lattice size during charging/discharging of a battery. This is the reason why the volume of the active material layer is largely changed during charging/discharging of a battery. Therefore, the distortion of the active material layer and the peeling from the current collector are easily caused. The occurrence of the distortion and peeling leads to increased resistance, thereby the cycle performance of a battery is deteriorated. Accordingly, when these compounds are used as the active material, the effect of the embodiment is obtained more significantly.

Further, lithium titanate having a spinel structure and $TiO_2(B)$ exhibit solid acidity. This reason is considered to be that the solid acid points (for example, a hydroxyl group ($OH^-$) and a hydroxyl group radical (OH.)) which has highly reactivity are present on the surface of the compound. Such a compound has high reactivity with the nonaqueous electrolyte. Therefore, the nonaqueous electrolyte is decomposed and thus, byproduct is produced. Accumulation of the byproduct gives rise to the problems such as deterioration of electrode performance, the breakage of a conductive path, and increase of resistance. Further, there is the problem that the nonaqueous electrolyte is deteriorated when it is decomposed.

However, the acrylic based polymer has small volumetric shrinkage after drying. Thus, the acrylic based polymer has excellent coatability. The acrylic based polymer can therefore stick to the active material to coat the solid points, thereby inactivating the solid points. Thus, the reaction between the titanium oxide compound and the nonaqueous electrolyte is lowered. As a result, deterioration in the performance of the electrode, increase in the internal resistance of battery and deterioration of the nonaqueous electrolyte are limited. Further, the irreversible capacity of a battery is reduced and also, charging/discharging efficiency is improved when the solid acid points of the active material is inactivated. These facts produce improvement of the cycle performance of a battery. The solid acid points of the active material are unnecessarily all coated, but at least a part of these solid points may be coated.

Moreover, the cycle performance can be more improved by using, as the binder, PVdF together with the acrylic based polymer. It is thought that the effect is obtained because PVdF restrains the influence exerted when the acrylic based polymer is swollen by the electrolyte solution. Since the coatability is improved by using the acrylic based polymer and the swelling is restricted by using PVdF, the strength of the electrode is more improved and variation in the volume of the active material and the breakage of an electron conductive path caused by swelling are limited.

$TiO_2(B)$ is largely changed in crystal lattice size during charging/discharging of a battery. For this, when $TiO_2(B)$ is used as the active material, the effect of the embodiment is obtained more significantly. Further, secondary particles of $TiO_2(B)$ break easily when the density of an electrode is increased, whereby the electric path between primary particles may be cut. In this case, the input and output performances of a battery are deteriorated. However, the density of the electrode can be raised while keeping the shape of secondary particles by using the acrylic based polymer having high adhesiveness. This ensures that a close electric path can be formed between primary particles and secondary particles of $TiO_2(B)$. Therefore, the high energy density of $TiO_2(B)$ can be utilized. This makes it possible to provide an electrode for attaining a nonaqueous electrolyte battery which has a high energy density and is superior in input/output performances.

The acrylic based polymer and PVdF in the active material layer 120 may be bound and/or adhere to at least a part of the surface of any one or both of the primary particle and secondary particle of the active material 121. The acrylic based polymer and PVdF may also exist in gaps between particles of the active material 121 and the conductive agent 123. The acrylic based polymer and PVdF preferably may coat at least a part of particle of the active material 121. However, the degree of the coating (thickness and area of the adhered polymer) is within the range where the conductivity and intercalation of Li are not inhibited.

The existence of the acrylic based polymer in the active material layer 120 can be confirmed by infrared absorption spectrum (IR) analysis and pyrolysis gas chromatography/mass analysis (GC/MS). The existence of PVdF in the active material layer 120 can be confirmed by IR measurement and fluorine nuclear magnetic resonance spectroscopy (F-NMR). Further, a transmission type electron microscope (TEM) or scanning electron microscope (SEM) may be used to confirm that the active material 121 is coated with the acrylic based polymer and, optionally, PVdF.

According to the above embodiment, an electrode that achieves a nonaqueous electrolyte battery having excellent cycle performances can be provided.

Second Embodiment

Figure 2:
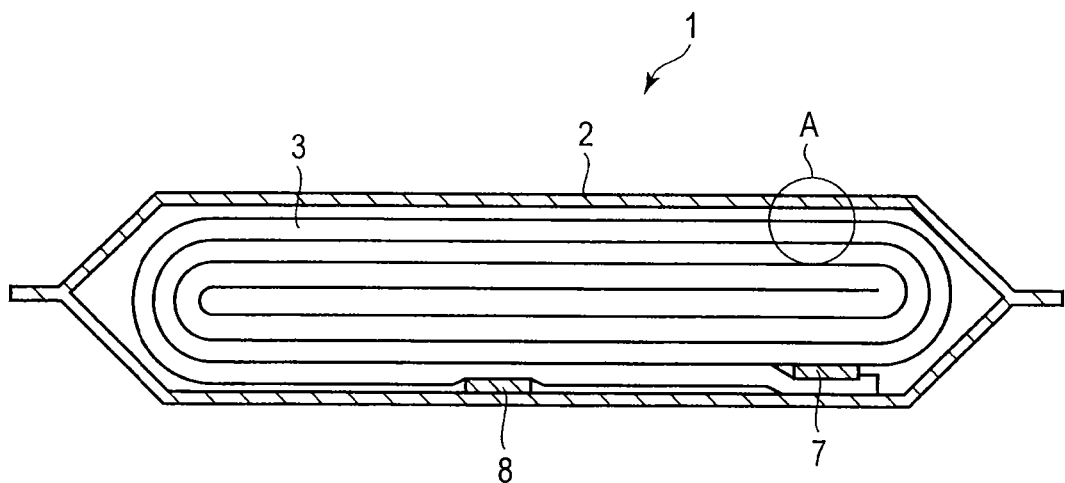
FIG. 2 is a typical sectional view of a nonaqueous electrolyte battery according to a second embodiment.

A nonaqueous electrolyte battery according to a second embodiment will be explained. FIG. 2 is a typical sectional view of a flat type nonaqueous secondary battery which is an example of the nonaqueous electrolyte battery. FIG. 3 is an enlarged sectional view of the part A in FIG. 2.

A battery 1 includes a container 2 and an electrode group 3 accommodated in the container 2. Here, a wound electrode group is used as the electrode group 3. The container 2 has a baggy shape. A nonaqueous electrolyte (not shown) is included in the container 2.

The electrode group 3, as shown in FIG. 3, includes a positive electrode 4, a negative electrode 5, and a plurality of separators 6. The electrode group 3 has a structure in which a laminate is spirally coiled. This laminate has, though not limited to, a structure in which the separator 6, positive electrode 4, another separator 6, and negative electrode 5 are laminated on each other in this order. The flat wound electrode group is manufactured by spirally wounding the laminate such that the negative electrode is positioned on the outermost periphery and then by pressing under heating.

The positive electrode 4 includes a positive electrode current collector 4a and a positive electrode active material layer 4b containing a positive electrode active material (hereinafter referred to as the "positive electrode layer"). The positive electrode layer 4b is provided on each surface of the positive electrode current collector 4a. The positive electrode layer 4b contains a positive electrode active material and optionally, a conductive agent and a binder.

As the positive electrode active material, various oxides, sulfides, polymers, and the like may be used.

Example of the positive electrode active material includes manganese dioxide (for example, $MnO_2$), iron oxide, copper oxide, nickel oxide, lithium-manganese complex oxide (for example, $Li_xMn_2O_4$ or $Li_xMnO_2$), lithium-nickel complex oxide (for example, $Li_xNiO_2$), lithium-cobalt complex oxide (for example, $Li_xCoO_2$), lithium-nickel-cobalt complex oxide (for example, $LiNi_{1-y}Co_yO_2$), lithium-manganese-cobalt complex oxide (for example, $LiMn_yCo_{1-y}O_2$), lithium-manganese-nickel complex oxide having a spinel structure (for example, $Li_xMn_{2-y}Ni_yO_4$), lithium-phosphorous oxide having an olivine structure (for example, $Li_xFePO_4$, $Li_xFe_{1-y}Mn_yPO_4$, or $Li_xCoPO_4$), iron sulfate (for example, $Fe_2(SO_4)_3$), and vanadium oxide (for example, $V_2O_5$). Further, organic materials and inorganic materials, for example, conductive polymer materials such as a polyaniline or polypyrrole, disulfide based polymer materials, sulfur (S), or carbon fluoride may be used.

As the positive electrode active material, a compound which can provide a high battery voltage is preferably used. Example of such a compound includes lithium-manganese complex oxide (for example, $Li_xMn_2O_4$), lithium-nickel complex oxide (for example, $Li_xNiO_2$), lithium-cobalt complex oxide (for example, $Li_xCoO_2$), lithium-nickel-cobalt complex oxide (for example, $LiNi_{1-y}Co_yO_2$), lithium-manganese-nickel complex oxide having spinel structure (for example, $Li_xMn_{2-y}Ni_yO_4$), lithium-manganese-cobalt complex oxide (for example, $LiMn_yCo_{1-y}O_2$), and lithium-iron phosphate (for example, $Li_xFePO_4$). In the above formula, x and y are preferably in a range from 0 to 1, respectively.

Also, Lithium-nickel-cobalt-manganese complex oxide represented by the formula $Li_aNi_bCo_cMn_dO_2$ may be used as the positive electrode active material. In the formula, a, b, c, and d satisfy the relationship represented by the inequality $0 \leq a \leq 1.1$, $0.1 \leq b \leq 0.5$, $0 \leq c \leq 0.9$, and $0.1 \leq d \leq 0.5$, respectively.

The positive electrode active material may contain any one of the above compounds singly or may contain two or more of the above compounds. Alternatively, the positive electrode active material may further contain one or more other oxides. The ratio of the total mass of other oxides to the total mass of the positive electrode active material is preferably less than 50% by mass.

In the case a nonaqueous electrolyte contains a ionic liquid, it is preferable to use a compound selected from the group consisting of lithium-iron phosphate, $Li_xVPO_4F$ ($0 \leq x \leq 1$), lithium-manganese complex oxide, lithium-nickel complex oxide, and lithium-nickel-cobalt complex oxide as the active material. In such a case, the reactivity between the positive electrode active material and the ionic liquid is lowered and therefore, cycle performance can be improved.

The conductive agent is used, as needed, to improve current-collecting performance and to restrain the contact resistance between the active material and the positive electrode current collector 4a. Example of the conductive agent includes carbon materials such as acetylene black, carbon black, graphite, carbon nanofiber, or carbon nanotube.

The binder is blended, as needed, to bind the active material, conductive agent, and positive electrode current collector 4a with each other. Example of the binder includes a polytetrafluoroethylene (PTFE), polyvinylidene fluoride (PVdF), fluoro-rubber, acryl rubber and acryl resin. These materials may be used either singly or in combinations of two or more.

The active material, conductive agent, and binder in the positive electrode layer 4b are preferably formulated in proportions of 80% by mass to 95% by mass, 3% by mass to 18% by mass, and 2% by mass to 17% by mass, respectively.

When the content of the conductive agent is 3% by mass or more, the aforementioned effect can be obtained. When the content of the conductive agent is 18% by mass or less, the decomposition of the nonaqueous electrolyte which occurs on the surface of the conductive agent when a battery is stored at a high temperature can be restricted.

When the content of the binder is 2% by mass or more, sufficient positive electrode strength is obtained. Because the binder is an insulation material, the content of the binder is preferably 17% by mass or less. Thus, increase in internal resistance can be limited.

The positive electrode current collector 4a is preferably an aluminum foil, or an aluminum alloy foil containing at least one element selected from the group consisting of Mg, Zn, and Si. The thickness of the aluminum foil or aluminum alloy foil is preferably 20 μm or less, and more preferably 15 μm or less. The purity of the aluminum foil is preferably 99% by mass or more. When transition metals such as Fe, Cu, Ni, or Cr are contained, the content of these transition metals is preferably 1% by mass or less.

The density of the positive electrode layer is preferably 3 g/cm$^3$ or more.

The positive electrode can be manufactured by the following method. First, the positive electrode active material, conductive agent, and binder are suspended in a proper solvent to prepare slurry. This slurry is applied to both surfaces of the positive electrode current collector and dried to form the positive electrode layer. Then, the positive electrode layer is subjected to pressing. Alternatively, the positive electrode active material, conductive agent, and binder are made into a pellet, which may be used as the positive electrode layer. The positive electrode layer thus obtained is disposed on the current collector to construct the electrode.

The electrode according to the first embodiment may be used as the negative electrode 5.

The negative electrode current collector 5a is preferably formed of an aluminum foil or an aluminum alloy foil containing at least one element selected from the group consisting of Mg, Zn, and Si. The purity of the aluminum foil is preferably 99% by mass or more. When transition metals such as Fe, Cu, Ni, or Cr are contained, the content of these transition metals is preferably 1% by mass or less.

The separator 6 may be made of a porous film containing a polyethylene, polypropylene, cellulose, or polyvinylidene fluoride (PVdF), or a synthetic resinous nonwoven fabric. The porous film made of polyethylene or polypropylene melts at a certain temperature and can block electric current, and thus it is preferred from the viewpoint of improvement in safety.

As the nonaqueous electrolyte, a liquid nonaqueous electrolyte may be used. The liquid nonaqueous electrolyte is prepared by dissolving an electrolyte in an organic solvent. The concentration of the electrolyte in the liquid nonaqueous electrolyte is preferably 0.5 mol/L to 2.5 mol/L.

Example of the electrolyte includes lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethasulfonate ($LiCF_3SO_3$), or bistrifluoromethylsulfonylimide lithium [$LiN(CF_3SO_2)_2$], and mixtures of these compounds. The electrolyte is preferably one which is scarcely oxidized at a high potential and $LiPF_6$ is the most preferable.

Example of the organic solvent includes cyclic carbonate such as propylene carbonate (PC), ethylene carbonate (EC) or vinylene carbonate (VC); chain carbonate such as diethyl carbonate (DEC), dimethyl carbonate (DMC) or methylethyl carbonate (MEC); cyclic ether such as tetrahydrofuran (THF), 2-methyltetrahydrofuran (2MeTHF) or dioxolan (DOX); chain ether such as dimethoxyethane (DME) or diethoxyethane (DEE); γ-butyrolactone (GBL), acetonitrile (AN), and sulfolane (SL). These organic solvents may be used either singly or in combinations of two or more.

Mixture solvents prepared by blending at least two types from PC, EC, and GBL are preferably used in battery employed in high-temperature environments, for example, the battery mounted on vehicles.

Also, an ionic liquid containing lithium ions may be used as the liquid nonaqueous electrolyte.

The ionic liquid means a salt at least part of which can exist in a liquid state at normal temperature. In the case, the normal temperature means a temperature range where power sources are assumed to usually operate. The temperature range is, for examples, from an upper limit of about 120° C. or about 60° C. depending on the case to a lower limit of about −40° C. or about −20° C. depending on the case.

As the lithium salt, those having a wide potential window and usually used in nonaqueous electrolyte battery are used. Example of the lithium salt includes, though not limited to, $LiBF_4$, $LiPF_6$, $LiClO_4$, $LiCF_3SO_3$, $LiN(CF_3SO_2)_2$, $LiN(C_2F_5SO_2)$, and $LiN(CF_3SC(C_2F_5SO_2))_3$. These lithium salts may be used either singly or in combinations of two or more.

The content of the lithium salt is preferably 0.1 to 3 mol/L and more preferably 1 to 2 mol/L. When the content of the lithium salt is 0.1 mol/L or more, the resistance of the electrolyte can be decreased. Thus, the discharge performance of a battery at large-current/low-temperature can be improved. When the content of the lithium salt is 3 mol/L or less, the melting point of the electrolyte can be kept low, enabling the electrolyte to keep a liquid state at normal temperature.

The ionic liquid has, for example, a quaternary ammonium organic cation or imidazolium cation.

Example of the quaternary ammonium organic cation includes imidazolium ions such as ions of dialkylimidazolium or trialkylimidazolium, tetraalkylammonium ion, alkylpyridium ion, pyrazolium ion, pyrrolidinium ion, and piperidinium ion. Particularly, an imidazolium cation is preferable.

Example of the tetraalkylammonium ion includes, though not limited to, a trimethylethylammonium ion, trimethylpropylammonium ion, trimethylhexylammonium ion, and tetrapentylammonium ion.

Further, Example of the alkylpyridium ion includes, though not limited to, a N-methylpyridium ion, N-ethylpyridinium ion, N-propylpyridinium ion, N-butylpyridinium ion, 1-ethyl-2-methylpyridinium ion, 1-butyl-4-methylpyridinium ion, and 1-butyl-2,4-dimethylpyridinium ion.

The ionic liquids having a cation may be used either singly or in combinations of two or more.

Example of the imidazolium cation includes, though not limited to, a dialkylimidazolium ion, and trialkylimidazolium ion.

Example of the dialkylimidazolium ions includes, though not limited to, a 1,3-dimethylimidazolium ion, 1-ethyl-3-methylimidazolium ion, 1-methyl-3-ethylimidazolium ion, 1-methyl-3-butylimidazolium ion, and 1-butyl-3-methylimidazolium ion.

Example of the trialkylimidazolium ion includes, though not limited to, a 1,2,3-trimethylimidazolium ion, 1,2-dimethyl-3-ethylimidazolium ion, 1,2-dimethyl-3-propylimidazolium ion, and 1-butyl-2,3-dimethylimidazolium ion.

The ionic liquids having above cation may be used either singly or in combinations of two or more.

As the container 2, a container formed of a laminate film or a metal container is used.

Examples of the shape of the container include a flat type (thin type), angular type, cylinder type, coin type, button type, sheet type, and laminate type.

The shape and size of the container 2 are designed corresponding to the dimension of the battery. For example, container for miniature battery to be mounted in, for example, mobile electronic device or container for large battery to be mounted on two- or four-wheel vehicle may be used.

As the laminate film, a multilayer film prepared by interposing a metal layer between resin films may be used. The metal layer is preferably made of an aluminum foil or aluminum alloy foil to reduce the weight of the battery. As the aluminum alloy, alloy containing at least one element such as Mg, Zn, or Si are preferable. When the alloy contains transition metal such as Fe, Cu, Ni, or Cr, the content of the transition metal is preferably 1% by mass or less. This makes it possible to outstandingly improve long-term reliability and heat radiation ability under a high-temperature environment.

The resin layer reinforces the metal layer. The resin layer may be made of polymer materials such as a polypropylene (PP), polyethylene (PE), nylon or polyethylene terephthalate (PET). The thickness of the laminate film forming the container 2 is preferably 0.5 mm or less and more preferably 0.2 mm or less. The laminate film can be molded into a desired shape of the container by sealing through thermal fusion.

The metal container may be made of aluminum, an aluminum alloy, iron, stainless, or the like. The aluminum alloy preferably contains element such as Mg, Zn, or Si. When the alloy contains transition metal such as Fe, Cu, Ni, or Cr, the content of the transition metals is preferably 1% by mass or less. The thickness of the metal plate forming the metal container is preferably 1 mm or less, more preferably 0.5 mm or less, and even more preferably 0.2 mm or less.

As shown in FIG. 2, a positive electrode terminal 7 is connected with the positive electrode current collector 3a in the vicinity of the outside peripheral end of the electrode group 1. Further, a negative electrode terminal 8 is connected with the negative electrode current collector 5a on the outermost periphery of the electrode group 3. The positive electrode terminal 7 and the negative electrode terminal 8 are extended to outside through an opening of the container 2.

The positive electrode terminal 7 may be made of a material which has conductivity and is electrically stable at a voltage range from 3 V (vs. Li/Li$^+$) to 5 V (vs. Li/Li$^+$). The positive electrode terminal 7 is preferably made of aluminum or an aluminum alloy containing at least one element selected from Mg, Ti, Zn, Mn, Fe, Cu, and Si. The positive electrode terminal 7 is preferably made of the same material as the positive electrode current collector 3a to reduce the contact resistance with the positive electrode current collector 3a.

The negative electrode terminal 8 may be made of a material which has conductivity and is electrochemically stable at a voltage range from 0.4 V (vs. Li/Li$^+$) to 3 V (vs. Li/Li$^+$). Example of such a material includes aluminum or an aluminum alloy containing at least one element selected from Mg, Ti, Zn, Mn, Fe, Cu, and Si. The negative electrode terminal 8 is preferably made of the same material as the negative electrode current collector 5a to reduce the contact resistance with the negative electrode current collector 5a.

The nonaqueous electrolyte battery is manufactured as follows. First, the electrode group 3 is accommodated in the container 2 and then, the liquid nonaqueous electrolyte is injected from the opening part of the container 2. Then, the electrode group is impregnated with the nonaqueous electrolyte. Then, the opening part of the container 2 is closed by heat sealing with the positive electrode terminal 7 and negative electrode terminal 8 being caught in the sealed opening part to thereby airtightly seal the electrode group 3 and nonaqueous electrolyte.

A battery which is limited in the increase of resistance and has high cycle performance can be provided by using, as the negative electrode, the electrode according to the above first embodiment.

FIGS. 4 and 5 show another example of the nonaqueous electrolyte battery. FIG. 4 is a partially broken perspective view typically showing another flat-type nonaqueous electrolyte secondary battery, and FIG. 5 is an enlarged sectional view of the part B in FIG. 4.

A battery 10 includes a container 12 made of a laminate film and a laminate-type electrode group 11 accommodated in the container 12. The laminate-type electrode group 11 has a structure in which a positive electrode 13 and a negative electrode 14 are alternately laminated with a separator 15 interposed therebetween. A plurality of positive electrodes 13 exist and are each provided with a positive electrode current collector 13a and a positive electrode layer 13b formed on each surface of the positive electrode current collector 13a.

A plurality of negative electrodes 14 exist and are each provided with a negative electrode current collector 14a and a negative electrode layer 14b formed on each surface of the negative electrode current collector 14a. Negative electrodes 14 have one side of the negative electrode current collector 14a extended out of the laminated positive electrode 13. The extended negative electrode current collector 14a is connected with a band-shaped negative electrode terminal 16. The end of the band-shaped negative electrode terminal 16 is extended out of the container 12. Further, though not shown here, one side of the positive electrode current collector 13a positioned opposite to the extended one side of the negative electrode current collector 14a is extended out of the laminated negative electrode 14. The extended positive electrode current collector 13a is connected with a band-shaped positive electrode terminal 17. The end of the band-shaped positive electrode terminal 17 is extended out of the container 12. The direction in which the positive electrode terminal 17 is drawn from the container 12 is opposite to the direction in which the negative electrode terminal 16 is drawn from the container 12.

Figure 6:
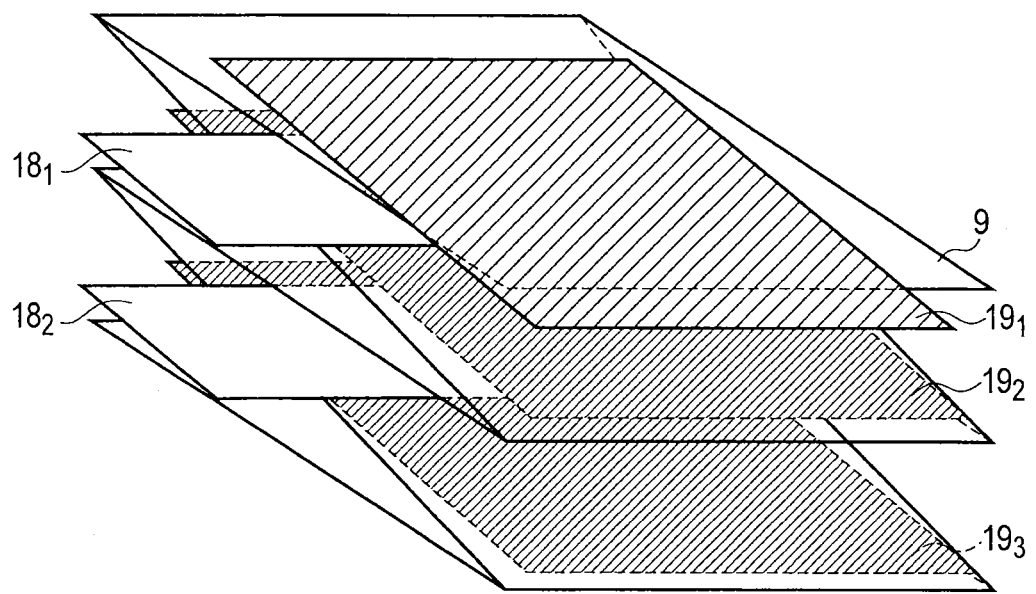
FIG. 6 is a perspective view showing another electrode group.

FIG. 6 shows other example of a laminate-type electrode group. FIG. 6 is an exploded perspective view of an electrode group. This electrode group is provided with a multi-folded separator 9, a strip-like positive electrode 18 and negative electrode 19. A negative electrode 19$_1$ is overlapped on the uppermost layer of the separator 9. Further, a positive electrode 18$_1$, a negative electrode 19$_2$, a positive electrode 18$_2$, and negative electrode 19$_3$ are inserted in this order from the top between the folded separators 9.

According to the embodiment, a nonaqueous electrolyte battery having excellent cycle performance can be provided.

Third Embodiment

Next, a battery pack according to a third embodiment will be explained. The battery pack includes one or more of the above nonaqueous electrolyte batteries (unit cells) according to the second embodiment. When the battery pack includes two or more unit cells, these unit cells are disposed in such a manner that they are electrically connected in series or in parallel.

Figure 7:
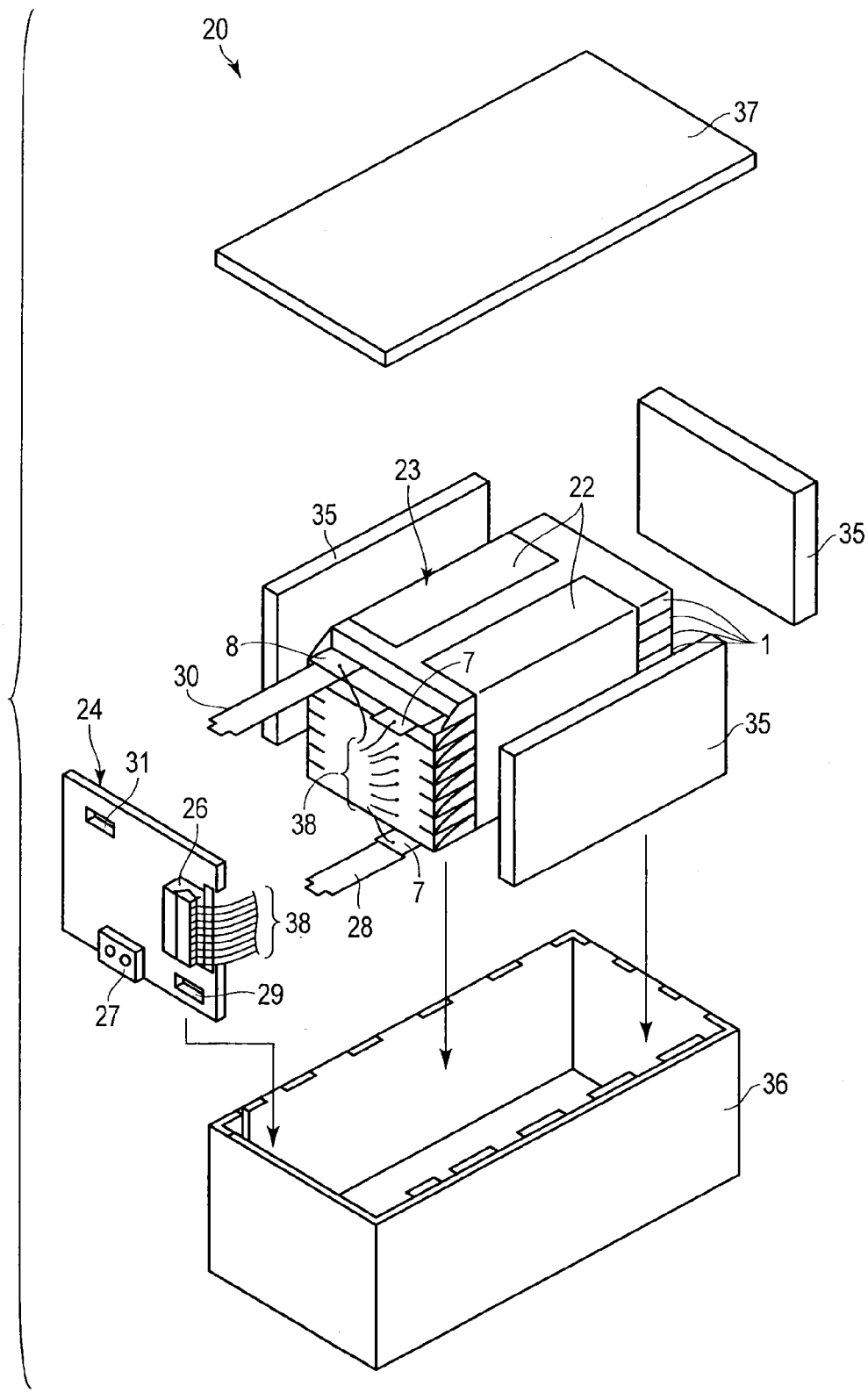
FIG. 7 is an exploded perspective view of a battery pack according to a third embodiment.
Figure 8:
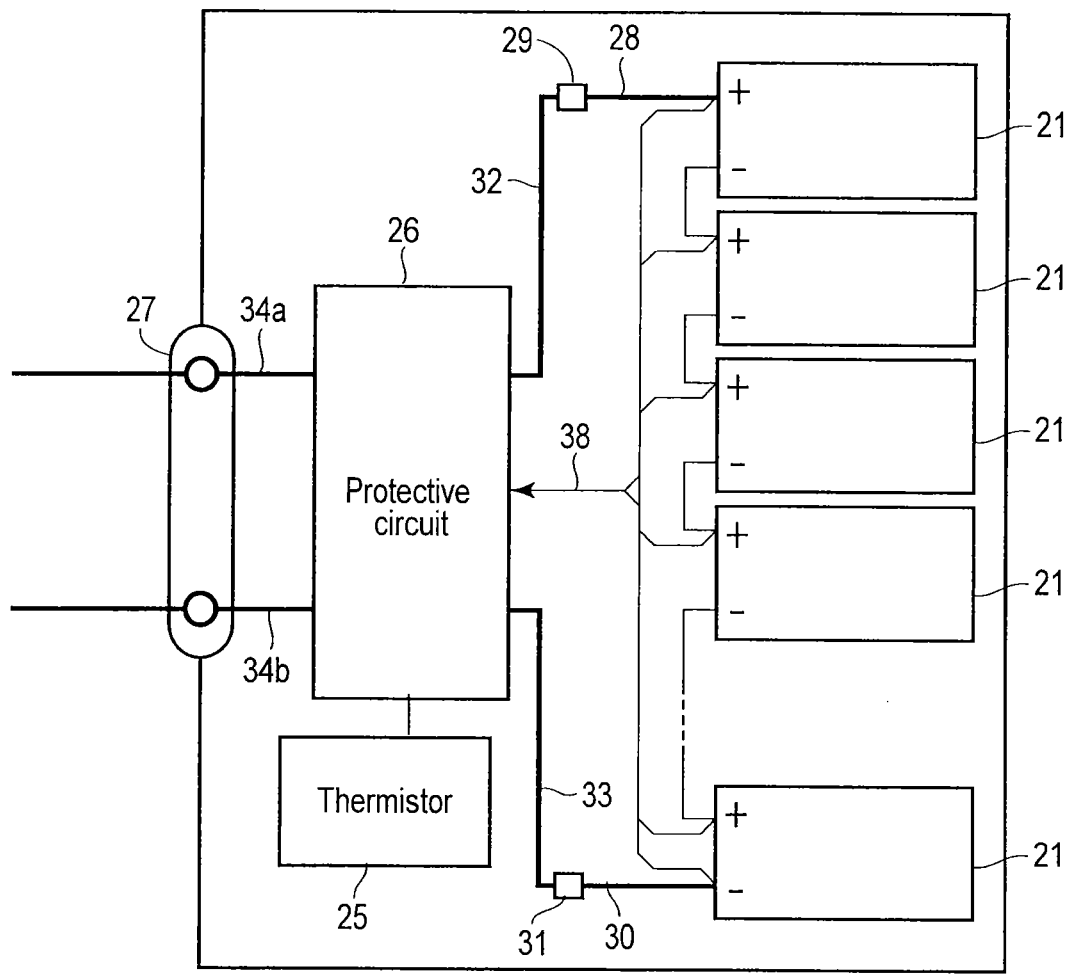
FIG. 8 is a block diagram showing an electric circuit of a battery pack of FIG. 6.

FIG. 7 and FIG. 8 show an example of a battery pack 20. FIG. 7 is an exploded perspective view of a battery pack 20. FIG. 8 is a block diagram showing the electric circuits of the battery pack 20 shown in FIG. 7.

This battery pack 20 comprises the plural cells 1. These cells 1 are laminated in the direction of the thickness and fastened with a pressure-sensitive adhesive tape 22 to constitute a battery assembly 23. These unit cells 1 are electrically connected in series as shown in FIG. 8.

The plural cells 1 are laminated such that the externally extended positive electrode terminal 7 and negative electrode terminal 8 are arranged in the same direction.

A printed wiring board 24 is disposed opposite to the side surface of the battery assembly 23 from which the negative electrode terminal 8 and positive electrode terminal 7 are extended.

As shown in FIG. 8, a thermistor 25, a protective circuit 26 and an energizing terminal 27 connected to external devices are mounted on the printed wiring board 24. An insulating plate (not shown) is attached to the surface of the printed wiring board 24 facing the battery assembly 23 to avoid unnecessary connection with the wiring of the battery assembly 23. The insulating plate (not shown) is formed of, for example, a rubber or resin.

A positive electrode side lead 28 is connected to the positive electrode terminal 7 positioned on the lowermost layer of the battery assembly 23 and one end of the positive electrode side lead 28 is inserted into and electrically connected to a positive electrode side connector 29 of the printed wiring board 24.

A negative electrode side lead 30 is connected to the negative electrode terminal 8 positioned on the uppermost layer of the battery assembly 23 and one end of the negative electrode side lead 30 is inserted into and electrically connected to a negative electrode side connector 31 of the printed wiring board 24.

These connectors 29 and 31 are connected to the protective circuit 26 through wirings 32 and 33 formed on the printed wiring board 24.

The thermistor 25 is used to detect the temperature of the cell 1 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge or over-current of the cell 1. The detections of this overcharge and the like are made for individual cells 1 or whole cells. When individual cells 1 are detected, either the voltage of the battery may be detected or the potential of the positive electrode or negative electrode may be detected. In the latter case, a lithium electrode used as a reference electrode is inserted between individual cells 1. In the case of FIG. 7 and FIG. 8, a wiring 38 for detecting voltage is connected to each cell 1 and the detected signals are transmitted to the protective circuit 26 through these wirings 38.

A protective sheet 35 made of a rubber or resin is disposed on each of the three side surfaces of the battery assembly 23 excluding the side surface from which the negative electrode terminal 8 and positive electrode terminal 7 are projected.

The battery assembly 23 is accommodated in a container 36 together with each protective sheet 35 and printed wiring board 24. Specifically, the protective sheet 35 is disposed on each inside surface in the direction of the long side and on one of the inside surfaces in the direction of the short side of the container 36, and the printed wiring board 24 is disposed on the other inside surface in the direction of the short side. The battery assembly 23 is positioned in a space enclosed by the protective sheet 35 and the printed wiring board 24. A lid 37 is attached to the upper surface of the container 36.

Here, a thermally contracting tape may be used in place of the adhesive tape 22 to secure the battery assembly 23. In this case, after the protective sheet is disposed on both sides of the battery assembly and the thermally contracting tubes are wound around the battery assembly; the thermally contracting tape is contracted by heating to fasten the battery assembly.

The structure in which the cells 1 are connected in series is shown in FIG. 7 and FIG. 8. However, these cells 1 may be connected in parallel to increase the capacity of the battery pack. Alternatively, a combination of series and parallel connections may be used. The assembled battery packs may be further connected in series or parallel.

A nonaqueous electrolyte battery according to the second embodiment in which the utilization ratio of the negative electrode active material is uniformed mentioned above, is preferably used for a battery pack. When such a nonaqueous electrolyte battery is used in a battery pack, differences in capacity and impedance between cells can significantly be reduced. As a result, for example, in a battery assembly with cells connected in series, when the battery is fully charged, variations in battery voltage caused by individual difference of battery capacity can be decreased. Accordingly, the battery pack according to the embodiment can be easily controlled.

The structure of the battery pack is appropriately changed according to its use. According to the embodiment, a battery pack can be provided which is preferably used in applications in which excellent cycle performance and large-current performance are required. Specifically, a battery pack can be provided which is preferably used for power sources for digital cameras or power sources mounted on vehicles such as two- to four-wheel hybrid electric vehicles, two- to four-wheel electric vehicles and assist bicycles.

According to these embodiments, a battery pack having excellent cycle performances can be provided.

EXAMPLES

Production of an Electrode

A electrode was manufactured in the following manner. First, 85% by mass of $TiO_2(B)$, 7.5% by mass of graphite used as a conductive agent, and a total of 7.5% by mass of PVdF and an acrylic based polymer were added to N-methylpyrrolidone (NMP) and these components were mixed to prepare a slurry. The average molecular weight of PVdF used was $4 \times 10^5$. The obtained slurry was applied to an aluminum foil of 15 μm in thickness, dried, and then pressed. The density of the electrode was made to be 2.2 g/cm³ by controlling the pressure of the press.

The ratio of the mass of the acrylic based polymer to the sum of the masses of PVdF and acrylic based polymer was made to vary from 0% to 100% by 10% increments, thereby manufacturing electrodes according to Examples 1 to 10 and Comparative Example 1.

<Production of an Evaluation Cell>

The electrode manufactured above was cut into a square with sides of 2 cm long. This cut electrode was used as a working electrode. Further, a lithium metal foil which was a square with sides of 2.0 cm long was used as a counter electrode. Further, a lithium metal was used as a reference electrode. The working electrode and the counter electrode were made to face each other with a glass filter (separator) interposed therebetween. The reference electrode was inserted in such a manner that it did not contact with the working electrode and counter electrode. These electrodes were placed in a three-pole type glass cell. The working electrode, counter electrode, and reference electrode were each connected with a terminal of the glass cell.

On the other hand, an electrolyte solution was prepared by dissolving $LiPF_6$ as an electrolyte in a mixture solvent. The used mixture solvent contained ethylene carbonate and diethyl carbonate in a ratio by volume of 1:2. The concentration of $LiPF_6$ was 1 mol/L. 25 mL of this electrolyte solution was poured into the glass cell. After the separator and the electrode were sufficiently impregnated with the electrolyte solution, the glass cell was sealed. An evaluation cell according to examples and comparative examples were produced in this manner.

(Charge/Discharge Test)

Using the evaluation cell manufactured above, a charge/discharge test was made in a 25° C. thermostatic chamber. The charge/discharge rate was set to 1.0 C. One charging/discharging was performed as one cycle and 50 cycles were performed. The capacity of the cell was measured after the first charging/discharging and after 50 cycles. A 0.2 C capacity was confirmed at 25th cycle and 50th cycle. The first discharge capacity was set to 100% to calculate the discharge Capacity retention (%) after 50 cycles. The results are shown in Table 1.

Further, the resistance (Ω) after 50 cycles was measured. The resistance was measured in the following manner. The evaluation cell was set to an AC impedance measuring device to measure impedance while sweeping the frequency from 300 MHz to 10 Hz. A cole-cole plot of the obtained data was made to determine the maximum point of intersection of the plotted curve and X-axis as the resistance. The results are shown in Table 1.

(Measurement of Peel Strength)

Using an electrode manufactured in the above manner, its peel strength (g/cm) was measured. The measurement was made using the electrode before the electrode was pressed. The peel strength was measured in the following manner. Each electrode obtained by applying slurry to aluminum, followed by drying was cut into a 2×5 cm strip form. A tape was applied to the surface of the electrode and was subjected to a tensile strength tester to peel the electrode layer from the aluminum foil. The force detected when the electrode layer was peeled off was defined as the peel strength. The results are shown in Table 1.

TABLE 1

|  | Content ratio of an acrylic based polymer (mass %) | Capacity retention (%) | Resistance (Ω) | Peel strength (g/cm) |
|---|---|---|---|---|
| Comparative Example 1 | 0 | 3 | 266 | 5 |
| Example 1 | 10 | 9 | 43 | 6 |
| Example 2 | 20 | 25 | 40 | 10 |
| Example 3 | 30 | 43 | 35 | 21 |
| Example 4 | 40 | 57 | 28 | 55 |

TABLE 1-continued

|  | Content ratio of an acrylic based polymer (mass %) | Capacity retention (%) | Resistance (Ω) | Peel strength (g/cm) |
|---|---|---|---|---|
| Example 5 | 50 | 70 | 25 | 73 |
| Example 6 | 60 | 75 | 22 | 84 |
| Example 7 | 70 | 73 | 23 | 78 |
| Example 8 | 80 | 68 | 27 | 59 |
| Example 9 | 90 | 57 | 33 | 53 |
| Example 10 | 100 | 43 | 40 | 45 |

Examples 1 to 10 all had a higher Capacity retention than Comparative Example 1. Accordingly, the cycle performances were improved by using the acrylic based polymer. Examples 1 to 10 all had a lower resistance than Comparative Example 1. It was therefore shown that the rise of resistance was limited by using the acrylic based polymer. Examples 1 to 10 all had a higher peel strength than Comparative Example 1. It was therefore shown that the adhesive strength was increased by using the acrylic based polymer.

These facts suggested that the use of the acrylic based polymer restrained the rise of resistance, with the result that the cycle performances were improved.

Examples 1 to 9 each had a higher Capacity retention, a lower resistance, and a higher peel strength than Example 10. It was therefore shown that when PVdF was contained together with the acrylic based polymer, the strength was increased and the cycle performances were more improved.

It was also shown that an electrode having a higher strength was obtained when the acrylic based polymer and PVdF were contained and the acrylic based polymer was contained in a ratio of 40% by mass or more.

While certain embodiments have been described, these embodiments have been presented by way of example only, and are not intended to limit the scope of the inventions. These novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode comprising a current collector, said current collector having only one negative electrode active material layer provided on each surface thereof,
   wherein the negative electrode active material layer comprises a negative electrode active material, an acrylic based polymer, and a polyvinylidene fluoride,
   wherein the negative electrode active material consists of at least one selected from the group consisting of lithium titanate having a spinel structure and a monoclinic β-type titanium complex oxide,
   wherein the active material is coated with the acrylic based polymer and the polyvinylidene fluoride,
   wherein all solid acid points of the active material are coated with the acrylic based polymer, and
   wherein a ratio of a total mass of the acrylic based polymer to the sum of the total mass of the acrylic based polymer and a mass of the polyvinylidene fluoride is in a range from 60% by mass to 70% by mass.

2. The negative electrode according to claim 1, wherein the negative electrode active material consists of said lithium titanate having a spinel structure.

3. The negative electrode according to claim 1, wherein the negative electrode active material consists of said monoclinic β-type titanium complex oxide.

4. The negative electrode according to claim 1, wherein the negative electrode active material consists of said lithium titanate having a spinel structure and said monoclinic β-type titanium complex oxide.

5. A nonaqueous electrolyte battery comprising:
   a positive electrode;
   the negative electrode according to claim 1; and
   a nonaqueous electrolyte.

6. A nonaqueous electrolyte battery comprising:
   a positive electrode;
   the negative electrode according to claim 2; and
   a nonaqueous electrolyte.

7. A nonaqueous electrolyte battery comprising:
   a positive electrode;
   the negative electrode according to claim 3; and
   a nonaqueous electrolyte.

8. A nonaqueous electrolyte battery comprising:
   a positive electrode;
   the negative electrode according to claim 4; and
   a nonaqueous electrolyte.

9. A battery pack comprising:
   aqueous electrolyte battery according to claim 5; and
   a container accommodating the battery.

10. A battery pack comprising:
    the nonaqueous electrolyte battery according to claim 6; and
    a container accommodating the battery.

11. A battery pack comprising:
    the nonaqueous electrolyte battery according to claim 7; and
    a container accommodating the battery.

12. A battery pack comprising:
    the nonaqueous electrolyte battery according to claim 8; and
    a container accommodating the battery.

* * * * *